United States Patent [19]

Takahashi

[11] Patent Number: 4,904,943
[45] Date of Patent: Feb. 27, 1990

[54] METHOD FOR DETECTING LONG WAVES AND PREDICTING EARTHQUAKES

[75] Inventor: Kozo Takahashi, Higashi-Kurume, Japan

[73] Assignee: Communications Research Laboratory Ministry of Posts and Telecommunications, Tokyo, Japan

[21] Appl. No.: 241,261

[22] Filed: Sep. 7, 1988

[30] Foreign Application Priority Data

Oct. 7, 1987 [JP] Japan ................. 62-251470

[51] Int. Cl.⁴ ............................. G01V 3/12
[52] U.S. Cl. ................. 324/344; 324/348; 324/323; 340/601; 364/420
[58] Field of Search ............ 324/323, 344, 347, 348, 324/349, 350, 351; 340/601; 364/420, 421

[56] References Cited

U.S. PATENT DOCUMENTS 4,219,776  8/1980  Arulanandan .............. 324/323
4,392,109  7/1983  Warner .................. 324/323 X
4,507,611  3/1985  Helms ................... 324/323
4,612,506  9/1986  Varotsos et al. ......... 324/348
4,628,299 12/1986  Tate et al. ............. 324/323 X
4,698,759 10/1987  Eliason et al. .......... 324/323 X
4,724,390  2/1988  Rauscher et al. ......... 324/344

FOREIGN PATENT DOCUMENTS 63-184088  7/1988  Japan .

Primary Examiner—Reinhard J. Eisenzopf
Assistant Examiner—Warren S. Edmonds
Attorney, Agent, or Firm—Oblon, Spivak, McClelland, Maier & Neustadt

[57] ABSTRACT

A method for detecting earthquakes comprises the steps of picking up pre-earthquake long waves or earth currents at four or more observation points located underground or at the sea bottom, carrying out a computation based on the interrelation among the so-obtained signals to obtain the three-dimensional distribution of the sources and intensities of the long waves or earth currents, and predicting the focal region, scale and time of occurrence of earthquakes from the time-course variation in the so-obtained three-dimensional image of the wave source.

8 Claims, 3 Drawing Sheets

//4,904,943

METHOD FOR DETECTING LONG WAVES AND PREDICTING EARTHQUAKES

BACKGROUND OF THE INVENTION

1. Field of the Invention

This invention relates to a method for predicting the time of occurrence, scale and focal region of an earthquake wherein the long electromagnetic waves or earth currents generated as premonitory symptoms of an earthquake are measured and a tomograph of the source region is prepared from the results of the measurement.

2. Prior Art Statement

The conventional method of predicting earthquakes, which has been put into regular practice in some areas, involves the simultaneous measurement of pre-earthquake long waves or earth currents at a number of points. More specifically, in the conventional method the pre-earthquake long waves or earth currents are measured simultaneously at two or more points on the earth surface, and the point of origin of the electromagnetic waves or earth currents (hereinafter referred to as the "wave source") is computed from the amplitude ratio of the detected signals. (See, for example, P. Varotsos and K. Alexopoulos: Tectonophysics, 110, pp73–98 (1984) and P. Varotsos and K. Alexopoulos: Tectonophysics, 110, pp99–125 (1984).

The margin of prediction error by the conventional method is ± one week in terms of time, ±0.5 in terms of magnitude and ±50 km in terms of location of the focal region. Moreover the method does not enable prediction of the shape, size, or time-course changes of the source region of the pre-earthquake long waves and earth currents and it has been impossible with the method to depict a three dimensional representation of the wave source region. As a result, while the prediction error has been generally within the requirements of society as regards quake magnitude and focal region, the time error has been two orders of ten greater than what is acceptable.

There is also known a method of finding the wave source using a directional antenna (see, for example, T. Yoshino: Proceedings of 1985 International Symposium on Antennas and Propagation, 243-4, Kyoto, Japan). In this case too, however, it has not been possible to depict a three dimensional representation of the wave source region due to the difficulty in detecting the angle of elevation of the wave source direction and further to the large degree of error in the azimuth. For this reason, the error in determining the focal region, which is substantially coextensive with the wave source region, becomes large, as do the errors in the earthquake magnitude (which is a function of the size of the wave source region) and in the time of earthquake occurrence (which is a function of time-course changes in the wave source region).

The present inventor previously proposed a method of picking up long electromagnetic waves and earth currents generated as premonitory symptoms of earthquakes in such manner as to discriminate the same from long waves and earth currents caused by man-made noise, static and the like Japanese Patent Disclosure Sho 63-184088 and (U.S. Ser. No. 138,947).

OBJECT AND SUMMARY OF THE INVENTION

An object of this invention is to provide a method for detecting earthquakes which enables the aforesaid long waves and earth currents constituting premonitory symptoms of an earthquake to be used for computing the focal region of earthquakes at a precision one order of ten higher than the conventional methods and to predict the time of occurrence of earthquakes with greatly reduced error.

For attaining this object, the present invention provides a method for predicting earthquakes wherein pre-earthquake long electromagnetic waves or earth currents are simultaneous detected at four or more locations underground or on the sea bottom, and the distributions of the sources and intensities of the long electromagnetic waves or earth currents are three dimensionally computed from the interrelation among the detected signals, whereafter the focal region, scale and time of occurrence of the impending earthquake are predicted from three dimensional images of the source and intensity distributions and time-course changes therein.

In accordance with the present invention, the source and the intensity distributions of the long waves and earth currents can be ascertained three dimensionally, and since the intensity and the frequency of occurrence of long waves not exceeding 3 kHz as well as the size of the wave source region generally become maximum immediately before the occurrence of an earthquake, it becomes possible to predict the focal region, scale and time of occurrence of an impending earthquake from time-course changes in the aforesaid source and intensity distributions. Since the present invention uses information regarding phenomena occurring in the focal region, it is able to provide a considerable improvement in prediction accuracy.

The above and other objects and features of the invention will become more apparent from the following detailed description with reference to the accompanying drawings.

DETAILED DESCRIPTION OF THE PREFERRED EMBODIMENTS

Before going into an explanation of the present invention, the meaning of the terms "long waves" and "earth currents" will be clarified. While the terms "long waves" and "earth currents" are both in general use, they are not always used in exactly the same meaning. For the sake of clarity, therefore, these terms as used in this specification are defined here.

Long wave—an electromagnetic wave of a frequency not exceeding 300 kHz detected by an antenna embedded in the earth.

Earth current—a current produced by a magnetic field of a frequency not exceeding 300 kHz and detected by a pair of electrodes embedded in the earth. (While in fact it is a voltage that is measured by the pair of electrodes, the term "earth current" is used since, historically, it has been the current produced by an electric field that has been measured.)

Thus, the pre-earthquake long waves and earth currents referred to in this specification both relate to the same physical quantity. Since surface soil generally has a resistivity of $10^3$-$10^5$ $\Omega$m and a refractive index of 2-4, pre-earthquake electromagnetic waves of a frequency over 300 kHz are attenuated at 0.01-1 dB/m and are therefore seldom observed near the earth surface. It is for this reason that the present invention specifies the observed pre-earthquake waves as long waves.

It is difficult to determine the source of pre-earthquake long waves with high accuracy by observing the same above ground (in the atmosphere) since it is impossible to determine the point at which the waves will pass from the ground into the atmosphere, and even if simultaneous observation is carried out at numerous points, the precision of the determination remains poor because the long waves at different points are of different phase and come from different directions.

In this invention, this problem is overcome by carrying out simultaneous observation of the long waves at four or more points located underground or on the sea bottom, where there are substantially no accompanying noise waves.

Figure 1:
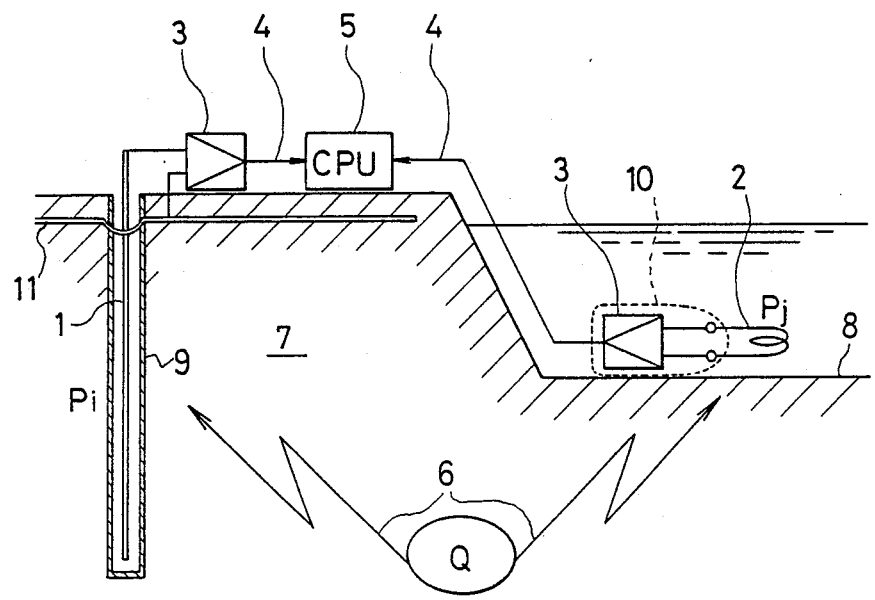
FIG. 1 is a schematic view illustrating the method of picking up pre-earthquake long electromagnetic waves in accordance with the present invention.

A specific example of how the observation is conducted is shown in FIG. 1. For observation on land, a conductive cable 1 is inserted into a deep well 9 in the earth 7 to form a monopole antenna. Where the deep well 9 has a conductive casing of steel or the like, the casing itself can be used as the monopole antenna without need of inserting a cable. In the figure, reference numeral 11 denotes a reflector for preventing atmospheric noise waves from entering the earth in the vicinity of the antenna. For observation in the sea, a sensor 10 equipped with a dipole or loop antenna 2 is installed on the sea bottom 8 at a depth to which electromagnetic waves above the sea surface are incapable of reaching through the sea water. (For details regarding the structure of this antenna, see U.S. Ser. No. 138,947.)

While FIG. 1 shows two antennas, one on land and one in the sea, the actual number of antennas used for picking up long waves for the purpose of predicting an earthquake of around magnitude seven is four or more, and the antennas are spaced from each other by around 200-300 km. For predicting an earthquake of magnitude 8 or larger, the interval between the antennas can be 400-500 km, while if small earthquakes of around magnitude 6 are to be predicted, it is necessary to reduce the interval between antennas to around 100-200 km. Where earth currents are to be observed, electrodes are used in place of the antennas.

Figure 2A:
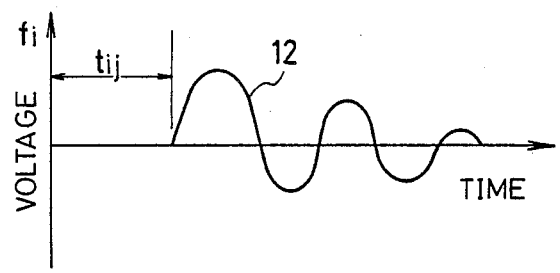
FIG. 2(a) is a graph showing the waveform of a wave received at the observation point Pi in FIG. 1.
Figure 2B:
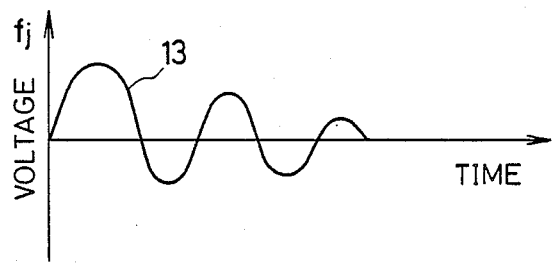
FIG. 2(b) is a graph showing the waveform of a wave received at the observation point Pj in FIG. 1.

When long waves and earth currents 6 indicative of an impending earthquake are produced by a focal region Q, these are picked up by antennas (electrodes) 1, 2 installed on land and/or in the sea before they pass from the ground into the atmosphere, and the resulting signals are sent to an amplifier 3. The amplified signals from the amplifier 3 are sent via a transmission path 4 to a CPU 5, where they are stored in memory.

Where two antennas simultaneously pick up long waves at respective first and second observation points Pi and Pj (FIG. 1) located at different distances from the wave source Q and the resulting signals (amplitude and phase information at time t) are defined as fi (curve 12 in FIG. 2(a)) and fj (curve 13 in FIG. 2(b)), the correlation function $\gamma ij$ between fi and fj becomes $$\gamma ij(\delta t) = \int_T fi(t+\delta t) fj(t) dt \quad (1)$$

where the integration range T is a time including that of the received wave packet.

The CPU 5 computes the value tij of the phase shift time $\delta t$ at which the correlation function $\gamma ij(\delta t)$ of equation (1) becomes maximal. (Where there are two or more wave sources, there will be two or more values of tij at which $\gamma ij(\delta t)$ becomes maximal.)

More specifically, a computation is made to find the value of tij at which the phase shift $\delta t$ between the two received waves satisfying the equations (2a), (2b) below becomes equal to the time difference tij between the times required for the two waves to reach the observation points Pi and Pj from the wave source Q ($\delta t = tij$).

$$\frac{d\gamma ij(\delta t)}{d\delta t} = 0 \quad (2a)$$

$$\frac{d^2\gamma ij(\delta t)}{d\delta t^2} < 0 \quad (2b)$$

Next, if the mean velocity of the long waves through the earth is denoted as c and the distances QPi and QPj as ri and rj, then since the difference between the two distances is equal to the value obtained by multiplying the difference tij between the reception times of the long waves at the antennas by the mean velocity c of the long waves, it follows that $$ri - rj = ctij \quad (3)$$

Equation (3) represents a rotational hyperboloid of two sheets having its foci at Pi, Pj. (See FIG. 3).

Follwing this, the CPU 5 carries out a computation with respect to the signals received at the aforesaid time from the first observation point Pi and the third observation point Pk to determine the value tik of the phase shift time $\delta t$ at which the correlation function becomes maximal, and then computes the rotational hyperboloid of two sheets having its foci at the first and third observation points.

Next the CPU 5 carries out a computation with respect to the signals received at the aforesaid time from the first observation point Pi and the fourth observation point Pl to determine the value til of the phase shift time $\delta t$ at which the correlation function becomes maximal, and then computes the rotational hyperboloid of two sheets having its foci at the first and fourth observation points.

Thus in the foregoing manner, the signals are received and stored simultaneously for four or more observation points, and three rotational hyperboloids of two sheets each having as its foci a different pair of the observation points are computed using the stored signals for three pairs of observation points, whereby the wave source Q can be three-dimensionally represented as the point of intersection of the hyperboloids and can be continuously observed so as to obtain a three-dimensional tomographic image of the wave source that varies with time.

Since in the prior art method the error in computing the wave source was about ±50 km, approximately as large as the wave source region, it was impossible to obtain the three-dimensional distribution of the wave source. In accordance with the present invention, however, nearly all of the error, aside from the statistical error arising from any discrepancy in the assumed mean velocity of the long waves, is the computational error $\Delta tij$ arising in the calculation tij. In the case where the long wave observation frequency band is, for example, 1 kHz, $\Delta tij$ can be held to not more than $10^{-5}$ sec. Thus, since the mean velocity c of the long waves in the earth is approximately $10^8$ m/s, the error in ctij is less than about 1 km (provided that the error in the velocity c is ignored). That is to say, the position of the wave source can be computed within a relative error of about ±1 km. Where the prediction is made with respect to earthquakes of a magnitude of seven or larger, the length of the focal region will be around 20 km or more and since the focal region and the wave source region substantially coincide, a relative error of 1 km in determining the wave source creates no substantial problem in obtaining a tomograph of the wave source region. More specifically, as explained in the foregoing, a continuous tomograph of the wave source region can be obtained by carrying out continuous observation at four or more locations within the earth or on the sea bottom, and this continuous tomograph can be used to predict the focal region, scale and time of occurrence of earthquakes.

An earthquake is a sudden shifting of the earth's crust along a fault plane that occurs when the stress within the crust comes to exceed the deformation limit. However, as the rock forming the crust of the earth is not homogeneous, small-scale disintegration and dislocation of the rock occur locally at points within the fault plane destined to become the focal region before the earthquake actually occurs. This gives rise to electromagnetic waves (long waves and currents). As a result, it becomes possible to predict the occurrence of an earthquake from the electromagnetic waves from the wave source region.

The relationship among the scale of an earthquake, the size of the focal region and the amount of shift along the fault plane is known, as is the relationship between the amount of shift and the intensity of the long waves produced. It is therefore possible to predict the scale of an earthquake from the size of the wave source and the intensity of the waves.

It is also known that an earthquake occurs within about one week after the occurrence of pre-earthquake long waves of a specific intensity. The method of the prediction of the main earthquake within about one week prior to its occurrence will now be explained.

The intensity of the long waves of a frequency of 3 kHz or less, the frequency of their occurrence and the size of the source of these waves all become maximum just before the occurrence of the main quake. Normally, there is then a lull and the main quake follows this. Thus, in accordance with this invention, a continuous tomograph of the wave source region is produced using as parameters the intensity, frequency of occurrence and time-course variation of the long waves. As mentioned earlier, the scale of an earthquake is proportional to the size of the focal region and the magnitude of the shift along the fault plane, the size of the focal region is substantially equal to the size of the source region of the pre-earthquake electromagnetic waves, and the magnitude of the shift along the fault plane is proportional to the intensity of the pre-earthquake waves. Ordinarily, it is earthquakes of magnitude seven or larger that cause damage. As it is known that an earthquake of magnitude seven or greater has a focal region extending over 20 km or more, the prediction is carried out by continuously observing the aforesaid continuous tomograph, determining the time when the wave source region, which is approximately equal to the focal region, will become greater than 20 km, and taking this as the predicted time for the occurrence of an earthquake of magnitude seven or greater.

Figure 3:
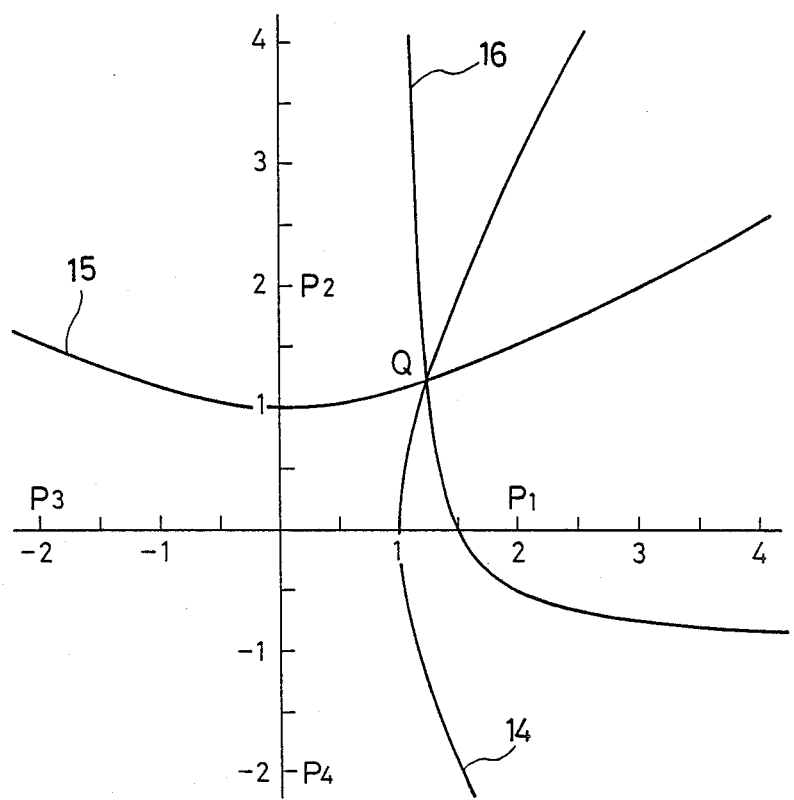
FIG. 3 is a tomograph illustrating the principle according to which a wave source Q is three dimensionally obtained as the intersection of three hyperboloids whose foci are different pairs of four points at which pre-earthquake long waves are simultaneously detected.

As shown in FIG. 1, when the observation of the pre-earthquake long waves is carried on land there is, for example, used as a monopole antenna a steel casing of a deep well, and when it is carried out on the sea bottom there is used a dipole or loop antenna formed by laying a cable on the sea bottom. The observation of the long waves is carried out at four or more locations. Where the waveform of the signal picked up at observation point Pi is as shown in FIG. 2(a) and that picked up at observation point Pj is as shown in FIG. 2(b), $\gamma(\delta t)$ becomes maximal when $\delta t$ of equation (1) is equal to tij of FIG. 2(a). Where $ct_{31}=ct_{42}=ct_{41}=1$, equation (3) becomes as follows. (Here $t_{31}$ is tij of equation (3) in the case where $i=3$ and $j=1$ and represents the time difference between the reception of the electromagnetic waves from points P3 and P1; and $t_{42}$ is tij of equation (3) in the case where $i=4$ and $j=2$ and represents the time difference between the reception of the electromagnetic waves from points P4 and P2; and so on.)

$$r_3 - r_1 = 1 \quad (4)$$

$$r_4 - r_2 = 1 \quad (5)$$

$$r_4 - r_1 = 1 \quad (6)$$

Where Q and Pi ($i=1, 2, 3, 4$) are in the same plane and P1, P2, P3, P4 are respectively (2, 0), (0, 2), (−2, 0), (−2, −2), the hyperboloids of equations (4)−(6) are shown by the intersection lines of the aforesaid planes to the hyperboloids 14, 15, 16 of FIG. 3. When represented on a cartesian coordinate system, the intersection lines to the hyperboloids 14−16 become as shown by the following equations:

$$x^2 - y^2/3 = 1 \quad (4')$$

$$-x^2/3 + y^2 = 1 \quad (5')$$

$$2xy + 2x - 2y = 3 \quad (6')$$

The intersection of the hyperboloids 14, 15, 16 is the wave source Q and value ($\sqrt{1.5}$, $\sqrt{1.5}$) obtained by analytically solving the equations (4')−(6') is also Q.

By continuously carrying out the aforesaid observation and computation, it becomes possible to represent a three-dimensional image of the wave source region as a function of time. Since the relationship between the magnitude of the shift along the fault plane and the intensity of the electromagnetic waves is known, it is possible from time-course changes in the continuous three-dimensional image representing the intensity distribution of the long waves originating from the wave source region to predict the scale, focal region and time of occurrence of earthquakes with high accuracy.

In accordance with this invention, the region from which the pre-earthquake long waves originate can be computed on the basis of the phenomena occurring in the focal region with an accuracy that it is one order of ten higher than that possible with the conventional method. Moreover, from the time-course changes occurring in the source region, it is possible to indicate the situation existing before the occurrence of an earthquake more concretely than has been possible with the conventional method, and the range of error in predicting the time of earthquake occurrence can be reduced to 10% or less of that according to the conventional method.

What is claimed is:

1. A method for detecting pre-earthquake long electromagnetic waves and for predicting earthquakes based thereon, comprising the steps of:

locating a plurality of observation points at which long waves may be detected;

installing an antenna at each of said plurality of locations;

sensing the presence of said long waves by each of said antennas;

transmitting a signal indicative of said long waves from each antenna to a storage device;

storing data representing the transmitted signal in said storage device;

computing the value of a phase shift time at which a correlation function between two of said signals becomes maximal;

determining the location of a rotational hyperboloid of two sheets having its foci at the two observation points from which the sensed signals are obtained;

repeating the computing and determining steps for at least one additional pair of sensed signals and observation points;

determining the intersection of the hyperboloids; and predicting the occurrence, location and magnitude of an earthquake based on both the intersection of the hyperboloids and the correlation coefficient of said correlation function.

2. A method for detecting earthquakes according to claim 1 wherein said observation points are separated from each other by 100–500 km.

3. A method according to claim 1, wherein at least one of said antennas is a monopole antenna mounted in a hole in the ground.

4. A method according to claim 1, wherein at least one of said antennas is a dipole antenna on the sea floor.

5. A method according to claim 1, wherein at least one of said antennas is a loop antenna on the sea floor.

6. A method according to claim 1, wherein there are substantially no accompanying noise waves at said plurality of observation points.

7. The method according to claim 1, wherein at least four observation points and antennas are utilized.

8. A method according to claim 1, wherein the computing and determining steps are continuously repeated to obtain a three dimensional representation of the wave source region.

* * * * *